Nov. 15, 1960 L. E. STAAK 2,960,371
BEARING LUBRICATING STRUCTURE
Original Filed April 18, 1955

Inventor:
Louis E Staak,
by Robert G. Iriz
His Attorney.

United States Patent Office 2,960,371
Patented Nov. 15, 1960

2,960,371
BEARING LUBRICATING STRUCTURE

Louis E. Staak, Fort Wayne, Ind., assignor to General Electric Company, a corporation of New York Original application Apr. 18, 1955, Ser. No. 501,963. Divided and this application June 25, 1956, Ser. No. 593,588

2 Claims. (Cl. 308—132)

This application is a division of my application Serial No. 501,963, filed April 18, 1955 and assigned to the assignee of the present application.

This invention relates to bearings for rotating shafts, and more particularly to sleeve bearings of the type which are lubricated by means of lubricant absorbent material positioned within the bearing housing.

It is most desirable that sleeve bearings for rotating shafts be capable of operating as long as possible without the necessity of lubricant having to be added. During such operation the bearing should, of coure, be assured of an adequate supply of lubricant. Consequently, it has become conventional in connection with many types of sleeve bearings to provide a bearing housing within which there is positioned a mass of lubricant absorbent material. This mass acts in effect as a reservoir for the lubricant and generally is arranged to touch the shaft at one or more points so that lubricant is gradually fed to the shaft at the bearing surface. While this construction achieves the desired effect, it is both difficult and expensive to arrange the lubricant absorbent material properly within the bearing housing due to the relative inaccessibility of the space within the housing. This has created high costs in the manufacturing process and has prevented the full utilization of the space within the bearing housing because of the difficulty involved in completely filling the housing through the openings provided. It will be seen from the foregoing that it is most desirable to provide a sleeve bearing structure with the space within the bearing housing entirely filled with lubricant absorbent material.

It is, therefore, an object of this invention to provide an improved bearing structure incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broadest aspect, this invention provides a bearing which has a sleeve member adapted to support a rotatable shaft. A bearing housing is secured to the sleeve member so as to support it and is formed in radially spaced relation to the sleeve member. An integral mass of lubricant-absorbent foam material having an interconnecting cellular structure is arranged to fill the space between the housing and the sleeve member.

The lubricant-absorbent material is located within the bearing housing by enclosing the space within the housing, introducing into the space a relative small amount of a material including a blowing agent which can be made to foam either by heat or agitation or a combination of the two, and causing the material to foam and fill the enclosed space. The term "blowing agent" is used to denote a composition capable of releasing gas so as to "blow" a material into a foam consistency.

In the drawing, Figure 1 is a side view, partly broken away and partly in cross section, of dynamoelectric machine having a shaft supported by the improved bearing of this invention;

Figure 1:
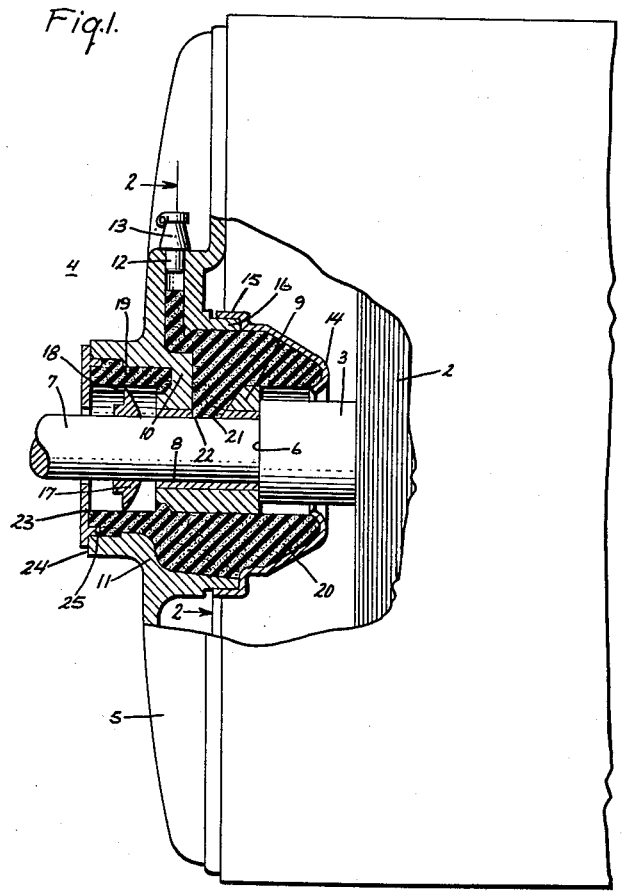
Figure 2:
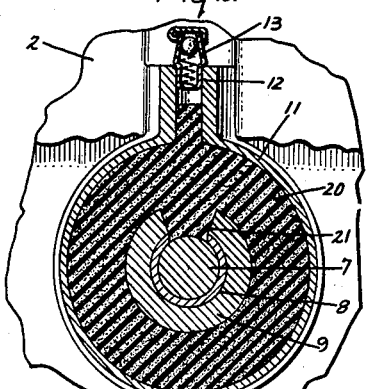
Figure 2 is a view along line 2—2 in Figure 1.

Referring now to Figures 1 and 2 of the drawing, there is shown a dynamoelectric machine, generally indicated at 1, provided with a rotor member 2 preferably made up of a plurality of superimposed thin laminations of magnetic material. Rotor 2 is secured to a shaft 3 which is rotatably mounted within a bearing 4 secured in end shield 5 of the dynamoelectric machine 1. Shaft 3 is provided with a shoulder 6 defining an extended portion 7 which has a relatively small diameter. Shaft portion 7 is rotatably supported within an insert 8 of a sleeve member 9 which is secured by spokes 10 to the bearing housing portion 11. Housing portion 11 may be formed as part of the end shield 2, and is provided with an opening 12 through which lubricant may be introduced into the bearing and which is adapted to be closed by a standard pressed-in oil cup member 13. An annular housing member 14 terminates at one end in a flange 15 which is engaged with flange 16 of housing portion 11 so that, in effect, housing portion 11 and member 14 form together the complete bearing housing.

A lubricant slinger member 17 is secured on extended shaft portion 7, as shown, so as to be rotatable therewith. Slinger 17 has a relatively pointed peripheral section 18 from which the lubricant is adapted to be thrown back into part 19 of integral mass 20. This mass is formed of a foam material having an interconnecting cellular structure, and is arranged to fill the space between the bearing sleeve member 9 and the housing members 11 and 14. In addition, portion 21 of the material extends into an opening 22 in sleeve member 9 so as to form a wick in engagement with the surface of extended shaft portion 7. Mass 20 is adapted to be saturated with a suitable lubricant which is fed to the bearing surface through wick 21. The lubricant is adapted to be returned to part 19 of mass 20 from the periphery 18 of lubricant slinger 17 by centrifugal force. The fact that mass 20 fills the interior of the bearing housing structure permits a large quantity of lubricant to be stored and eliminates wasted space. An annular member 23, provided to preclude leakage of lubricant from the bearing, may be secured by a flange 25 to the outer end 24 of housing portion 11.

Figure 3:
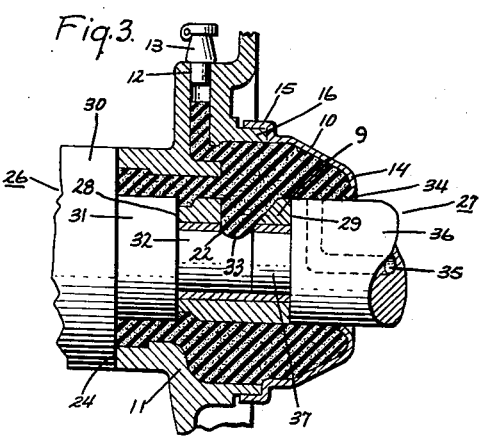
Figure 3 is a side view of the improved bearing of this invention, partly in cross section, illustrating the improved method of making the bearing.

Referring now to Figure 3, a preferred method of making the improved bearing of Figures 1 and 2 will be described. Before the shaft is inserted within sleeve 8 of bearing 4, a pair of mold parts 26 and 27 are respectively placed against ends 28 and 29 of sleeve member 9. Part 26 includes a large diameter portion which is arranged securely in engagement with end 24 of the bearing housing, a second portion 31 of intermediate diameter which abuts against end 28 of sleeve member 9, and a third portion 32 which fits within insert 8 in the same manner as extended portion 7 of shaft 3. Portion 32 of mold part 26 is preferably provided with a recess 33 which is arranged to coincide with opening 22 in sleeve member 9.

Part 27 has a main portion 36 with a diameter slightly larger than that of shaft 3 so that it is relatively snugly in engagement with inner end 34 of housing member 14, and a second portion 37 which fits within insert 8 in the same manner as extended shaft portion 7. A passageway 35 is provided in portion 36 for the insertion of the required material as will fully be set forth below. While passageway 35 has been shown in mold part 27 for illustrative purposes, it will of course be understood that this passageway may be equally effectively provided in the other mold part 26 or in any suitable part of the housing members 11 and 14 of the bearing.

With mold parts 26 and 27 in place as shown in Figure 3, the materials are inserted through passageway 35, the chemical reaction required to form the foam is achieved either by the provision of heat or agitation or both, as the case may be, and the mold parts 26 and 27 may then be removed.

As stated before, a prime feature of the invention is to provide a foam having an interconnecting cellular structure so that it will perform the wicking and feeding functions for the bearing lubricant. A great variety of different types of such foams are available. It is, therefore, clear that the inventive concept in this application is directed to a bearing structure filled with a particular type of lubricant-absorbent material, and that the broad invention is not to be limited to a specific material. However, for purposes of illustration, two different means of obtaining entirely different foams (from a chemical standpoint) each having a suitable interconnecting cellular structure will be given:

*First.*—An epoxy resin, characterized by an epoxide equivalent of between 190 and 375, was heated to 110 degrees centigrade. A mixture consisting of two grams of ammonium carbonate, five grams of toluene, and two drops of sorbitan monolaurate polyoxyalkylene derivative, a wetting agent, was then mixed with the resin, and six grams of diethylene triamine was then added. The heat caused decomposition of the ammonium carbonate [$(NH_4)_2CO_3$], the blowing agent, into water, ammonia ($NH_3$) and carbon dioxide. The release of the carbon dioxide caused the resin to foam. Experience has shown that the foam so produced is characterized by an interconnecting cellular structure, with the size of the cells being controlled primarily by the amount of wetting agent used. Curing of the resin is controlled by the hardener used (in this case, diethylene triamine). Another blowing agent besides ammonium carbonate which may be used, is diazo amino benzene.

*Second.*—To obtain a phenolic foam the materials used were: about 90 percent of A-stage phenolic resin (liquid and soluble); about 0.2 percent of sorbitan monolaurate polyoxyalkylene derivative, a wetting agent; about 0.7 percent of sodium bicarbonate (the blowing agent and catalyst); and about 9 percent of a 40 percent solution of phenolsulfonic acid. The acid was added to the other ingredients and agitated vigorously for 15 to 20 seconds. Without the necessity for any provision of heat, a foam having a density of one-third to 20 pounds per cubic foot (depending upon the volume in which the foam was contained) with good heat resistance and with an interconnecting cellular structure was obtained. It was found possible to substitute ammonium carbonate for the sodium carbonate with equally good results.

In view of the foregoing, it will be seen that this invention provides a novel bearing structure which readily lends itself to economical methods of providing such structure.

While the invention has been explained by a particular embodiment thereof, it will be apparent that improvements and modifications may be made without departing from the scope of the invention as defined in the appended claims.

What I claim as new and desire to secure by Letters Patent of the United States is:

1. In combination: a sleeve bearing; a shaft rotatably journaled in said bearing and extending axially beyond at least one end thereof, said bearing having an opening formed therein communicating with the journal surface of said shaft; a bearing housing including a portion extending radially outwardly from the other end of said bearing and secured thereto for supporting the same, said bearing housing including a generally cup-shaped member arranged concentrically about said bearing and shaft with its open end secured to said radially extending bearing housing portion and having an opening formed in its bottom with said shaft extending therethrough with a running clearance, said radially extending bearing housing portion and said cup-shaped member defining a first cavity with said bearing and said shaft, said bottom of said cup-shaped member being spaced axially from said one end of said bearing and forming an annular opening communicating with said first cavity, said first cavity having at least one cross-sectional area parallel to and substantially greater than the cross-section of said annular opening; said bearing housing having an axially extending portion projecting outwardly from the other side of said radially extending portion surrounding said shaft and forming a second cavity with said radially extending portion and said shaft; an integral mass of lubricant-absorbent foam material having an interconnecting cellular structure filling said bearing opening and said first and second cavities, said material being spaced from said shaft in each of said cavities; and means disposed on said shaft in at least one of said cavities adjacent one end of said bearing for centrifugally throwing lubricant into said lubricant-absorbent material.

2. In combination: a sleeve bearing; a shaft rotatably journaled into said bearing and extending axially beyond each end thereof, said bearing having an opening formed therein communicating with the journal surface of said shaft; a bearing housing having a first portion extending radially outwardly from one end of said bearing and secured thereto for supporting the same, said bearing housing having a second portion extending axially outwardly from one side of said first portion surrounding said bearing and said shaft and having an opening formed therein with said shaft extending therethrough with a running clearance, said first and second housing portions defining a first generally annular cavity with said bearing and said shaft, and second housing portion extending axially beyond the other end of said bearing forming an annular opening communicating with said first cavity, said first cavity having at least one cross-sectional area parallel to and substantially greater than the cross-section of said annular opening, said housing having a third portion extending axially outwardly from the other side of said first portion surrounding said shaft and forming a second cavity with said first housing portion and said shaft; an annular member closing said second cavity and having an opening formed therein with said shaft extending therethrough with a running clearance; said first housing portion having a plurality of axially extending openings formed therein around said bearing defining spokes and communicating with said first and second cavities; an integral mass of lubricant-absorbent foam material having an interconnecting cellular structure filling said bearing opening and said first cavity, extending through said axial openings in said first housing portion, and forming an annular layer in said second cavity spaced from said shaft; and a lubricant slinging member on said shaft in said second cavity for centrifugally throwing lubricant into said annular layer of lubricant absorbent material.

References Cited in the file of this patent

UNITED STATES PATENTS

| | | |
|---|---|---|
| 2,078,783 | Welch | Apr. 27, 1937 |
| 2,138,971 | Keeler et al. | Dec. 6, 1938 |
| 2,289,624 | Brown et al. | July 14, 1942 |
| 2,448,154 | Richmond | Aug. 31, 1948 |
| 2,572,568 | Gluesenkamp | Oct. 23, 1951 |
| 2,739,020 | Howes | Mar. 20, 1956 |
| 2,739,134 | Parry et al. | Mar. 20, 1956 |
| 2,751,265 | Wightman | June 19, 1956 |
| 2,753,642 | Sullivan | July 10, 1956 |

FOREIGN PATENTS

| | | |
|---|---|---|
| 401,596 | Great Britain | Nov. 16, 1933 |
| 938,941 | France | Dec. 15, 1954 |